(12) United States Patent
Lin

(10) Patent No.: US 6,647,825 B1
(45) Date of Patent: Nov. 18, 2003

(54) HAND BRAKE DEVICE

(76) Inventor: Ching-Hsu Lin, No. 11, Kung-Yeh S. 6th Rd., Nan-Kang Industrial Park, Nan-Tou City (TW)

( * ) Notice: Subject to any disclaimer, the term of this patent is extended or adjusted under 35 U.S.C. 154(b) by 0 days.

(21) Appl. No.: 10/347,775

(22) Filed: Jan. 17, 2003

(51) Int. Cl.[7] ................................................. F16C 1/10
(52) U.S. Cl. ...................................... 74/502.2; 74/489
(58) Field of Search .......................... 188/19; 74/501.6, 74/502.2, 489, 523

(56) References Cited

U.S. PATENT DOCUMENTS

| | | | | |
|---|---|---|---|---|
| 5,279,180 A | * | 1/1994 | Henriksson | 74/502.2 |
| 5,664,460 A | * | 9/1997 | Hewson | 74/502.2 |
| 5,865,065 A | * | 2/1999 | Chiu | 74/502.2 |
| 5,954,161 A | * | 9/1999 | Lee | 188/2 D |
| 6,032,765 A | * | 3/2000 | Hsi-Chia | 188/19 |
| 6,079,290 A | * | 6/2000 | Li | 74/502.2 |
| 6,098,487 A | * | 8/2000 | Chien | 74/502.2 |
| 6,192,772 B1 | * | 2/2001 | Huang | 74/502.2 |
| 6,202,502 B1 | * | 3/2001 | Chung-Che | 74/502.2 |
| 6,247,379 B1 | * | 6/2001 | Chen | 74/502.2 |
| 6,374,694 B1 | * | 4/2002 | Chen | 74/502.2 |

* cited by examiner

*Primary Examiner*—Jack Lavinder
*Assistant Examiner*—Benjamin A. Pezzlo
(74) *Attorney, Agent, or Firm*—Ostrolenk, Faber, Gerb & Soffen, LLP

(57) ABSTRACT

A hand brake device for a wheeled cart includes a pivot pin, and a brake lever including a lever portion, a front lower portion with a rounded integral projection, and a curved slot unit for receiving the pin slidably. Upward movement of the lever portion about the pin can result in braking of the cart, which will be freed upon release of the lever portion. Downward movement of the lever portion about the projection can also result in the braking of the cart, which will be maintained unless an external force is applied to the lever portion.

3 Claims, 8 Drawing Sheets

HAND BRAKE DEVICE

BACKGROUND OF THE INVENTION

1. Field of the Invention

The invention relates to a hand brake device, more particularly to a hand brake device for a wheeled cart.

2. Description of the Related Art

Referring to FIG. 1, a conventional hand brake device 1 is shown to be mounted on a handle 2 of a wheeled cart, such as a stroller or a wheelchair (not shown) and comprises a housing 10, a brake lever 20, and a cable pull rod 30. The housing 10 includes a mounting portion 11 sleeved fixedly on the handle 2 of the wheeled cart, and a receiving portion 12 formed integrally with and disposed under the mounting portion 11. The brake lever 20 has a front end portion that is provided with a fixed positioning member 21 and that is disposed within the receiving portion 12 of the housing 10, and a lever portion 22 that extends rearwardly from the front end portion and that projects from the housing 10. The positioning member 21 has one end pivotally connected to the housing 10 by means of a first pivot pin 13, and the other end formed with upper and lower retaining portions 211, 212. The pull rod 30 is mounted in the receiving portion 12 of the housing 10, extends transverse to the brake lever 20, is disposed behind the positioning member 21 of the brake lever 20, and has an upper end pivotally connected to the housing 10 by means of a second pivot pin 14, a lower end connected fixedly to a brake cable 3, and an intermediate portion formed with an upper protrusion 31 and a lower protrusion 32.

In a normal operating condition of the cart, the upper and lower protrusions 31, 32 of the cable pull rod 30 are disposed between the upper and lower retaining portions 211, 212 of the positioning member 21 of the brake lever 20, and the lever portion 22 of the brake lever 20 extends parallel to the handle 2 of the cart.

Referring to FIG. 2, when the lever portion 22 of the brake lever 20 is turned toward the handle 2 of the cart, the lower retaining portion 212 of the positioning member 21 moves to abut against the lower protrusion 32 of the pull rod 30, thereby pushing the pull rod 30 to move rearwardly. The pull rod 30, in turn, pulls the brake cable 3 so as to result in a braking action on the cart. The hand brake device 1 is disposed at a first braking position at this time. When the lever portion 22 of the brake lever 20 is released, the restoring force of the brake cable 3 pulls the pull rod 30 and the lever portion 22 of the brake lever 20 to their original positions shown in FIG. 1, thereby restoring the cart to a normal operating condition.

Referring to FIG. 3, when the lever portion 22 of the brake lever 20 is turned away from the handle 2 of the cart, the upper retaining portion 211 of the positioning member 21 moves past the upper protrusion 31 of the pull rod 30, and is retained in a groove between the upper and lower protrusions 31, 32 of the pull rod 30 so as to push the pull rod 30 rearwardly. The pull rod 30, in turn, pulls the brake cable 3 so as to result in the braking action on the cart. The hand brake device 1 is disposed at a second braking position at this time. Even if the lever portion 22 of the brake lever 20 is released at this moment, the braking of the cart is still maintained until an external force is applied to the lever portion 22 of the brake lever 20, thereby restoring the pull rod 30 and the lever portion 22 to their original positions shown in FIG. 1, and thereby restoring the cart to its normal operating condition.

Although the conventional hand brake device 1 can achieve its intended purpose, however, in actual use, the conventional hand brake device 1 is found to have the following disadvantages:

1. Since the brake lever 20 and the pull rod 30 are connected pivotally to the housing 10 at two different positions by two independent pivot pins 13, 14 during assembly, elements of the hand brake device 1 are increased.

2. Referring to FIG. 4, although the lever portion 22 of the brake lever 20 can be turned to a large extent relative to the handle 2 of the cart, displacement (L) of the lower retaining portion 212 of the positioning member 21 of the brake lever 20 during braking of the cart is relatively small such that rearward displacement of the pull rod 30 and the brake cable 3 is not large, thereby reducing effectiveness of the hand brake device 1.

3. Since the first braking position of the hand brake device 1 is frequently applied to the cart, the lower retaining portion 212 of the positioning member 21 and the lower protrusion 32 of the pull rod 30 are easily susceptible to wearing.

SUMMARY OF THE INVENTION

Therefore, the object of the present invention is to provide a hand brake device that is capable of overcoming the aforementioned drawbacks of the prior art.

According to the present invention, a hand brake device is adapted to be mounted on a handle of a wheeled cart having a brake cable. The hand brake device comprises a housing, a brake lever, and a cable pull rod. The housing includes a mounting portion adapted to be sleeved fixedly on the handle, and a hollow receiving portion connected fixedly to and disposed under the mounting portion. The receiving portion includes a front wall, two opposite lateral walls extending integrally and rearwardly from the front wall, and a pivot pin fixed in the receiving portion. The front wall has an inner wall surface that is formed with a curved limiting groove, and a bottom portion that is formed with a through hole therethrough, which is adapted to permit extension of the brake cable into the receiving portion through the through hole. The brake lever includes a pivot connecting portion, a lever portion, and a positioning block. The pivot connecting portion is disposed within the receiving portion of the housing, and has a front lower portion formed with a rounded integral projection. The lever portion extends integrally and rearwardly from the pivot connecting portion, and projects from the housing. The positioning block is connected fixedly to the front lower portion of the pivot connecting portion. The rounded integral projection of the pivot connecting portion is received fittingly within the curved limiting groove in the front wall of the housing so as to permit rotation of the lever portion of the brake lever about the rounded integral projection in a direction away from the handle. The positioning block has an abutment surface and a retaining groove, which are disposed-above and behind the rounded integral projection of the pivot connecting portion and which define a rearwardly extending protrusion therebetween. The pivot connecting portion is formed with a curved slot unit that is disposed above and behind the rounded integral projection and that has a closed front end and a closed rear end. The pivot pin of the housing extends through the rear end of the curved slot unit such that the brake lever can be turned upwardly and downwardly, thereby moving the lever portion toward and away from the handle. The cable pull rod is disposed within the receiving portion of the housing, and is located behind and abuts against the positioning block. The cable pull rod has a top end sleeved rotatably on the pivot pin of the housing, a lower end adapted to be connected fixedly to and pulled forwardly by an end of the brake cable, and a retaining portion for engaging the retaining groove in the positioning block. When the lever portion of the brake lever is turned upwardly, engagement between the retaining portion of the cable pull rod and the retaining groove and location of the pivot pin within the rear end of the curved slot unit are maintained such that the positioning block pushes the cable pull rod to turn rearwardly so as to rotate the brake lever about the pivot pin, thereby moving the rear end of the brake cable rearwardly for braking the cart, after which, upon release of the lever portion of the brake lever, the brake cable pulls and moves the lower end of the cable pull rod forwardly to engage the rounded integral projection of the brake lever within the curved limiting groove in the front wall of the housing. When the lever portion of the brake lever is turned downwardly, the lever portion of the brake lever rotates about the rounded integral projection of the pivot connecting portion such that the pivot pin slides from the rear end of the curved slot unit to the front end of the curved slot unit so that the retaining portion of the cable pull rod separates from the retaining groove in the positioning block to move past the rearwardly extending protrusion of the positioning block so as to engage the abutment surface of the positioning block, thereby pulling and moving the rear end of the brake cable rearwardly for braking the cart and thereby preventing further rotation of the brake lever about the rounded integral projection, after which the brake lever can be turned upwardly toward the handle only when an external force is applied to the lever portion of the brake lever.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
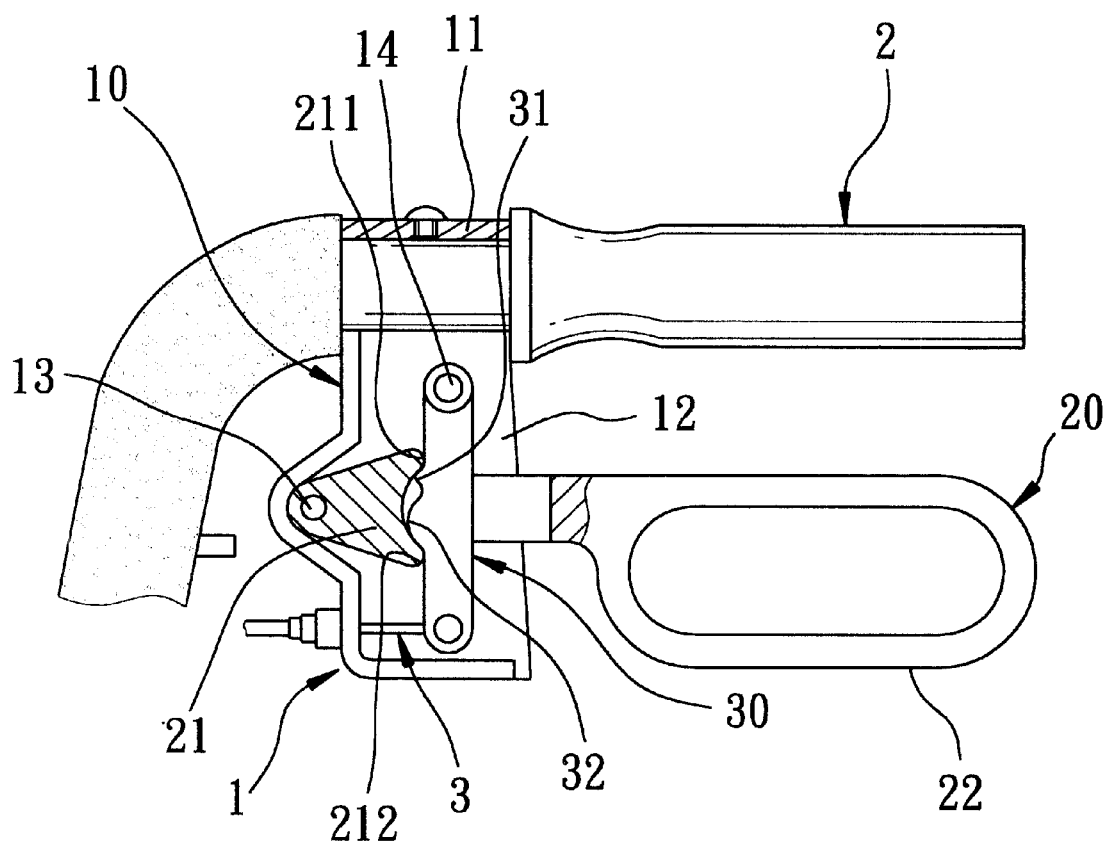
FIG. 1 illustrates a handle of a wheeled cart incorporating a conventional hand brake device.
Figure 2:
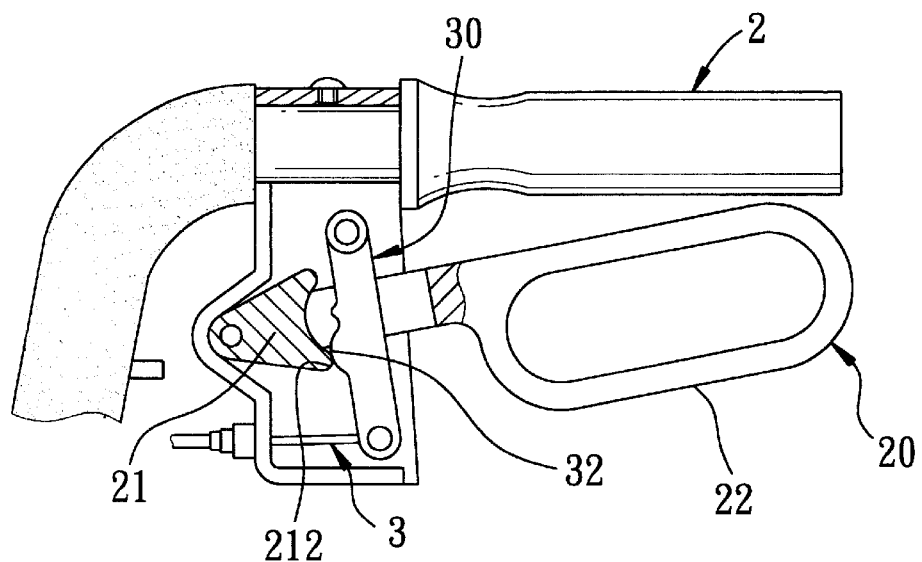
FIG. 2 illustrates the first braking position of the conventional hand brake device.
Figure 3:
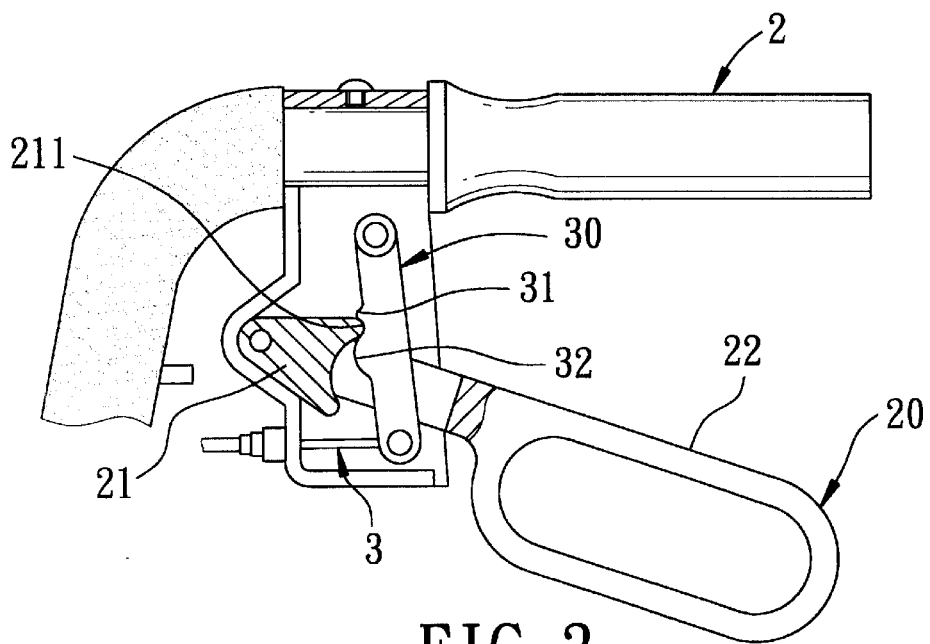
FIG. 3 illustrates the second braking position of the conventional hand brake device.
Figure 4:
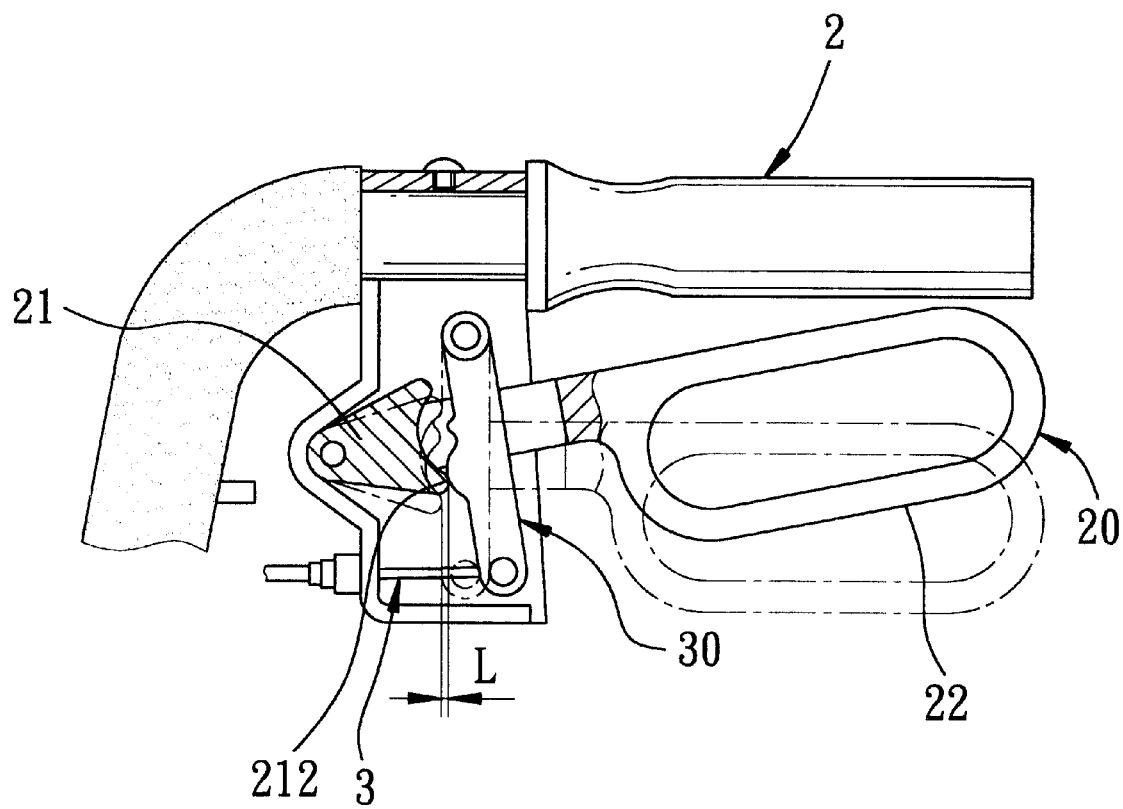
FIG. 4 illustrates how the conventional hand brake device operates when braking the cart.
Figure 5:
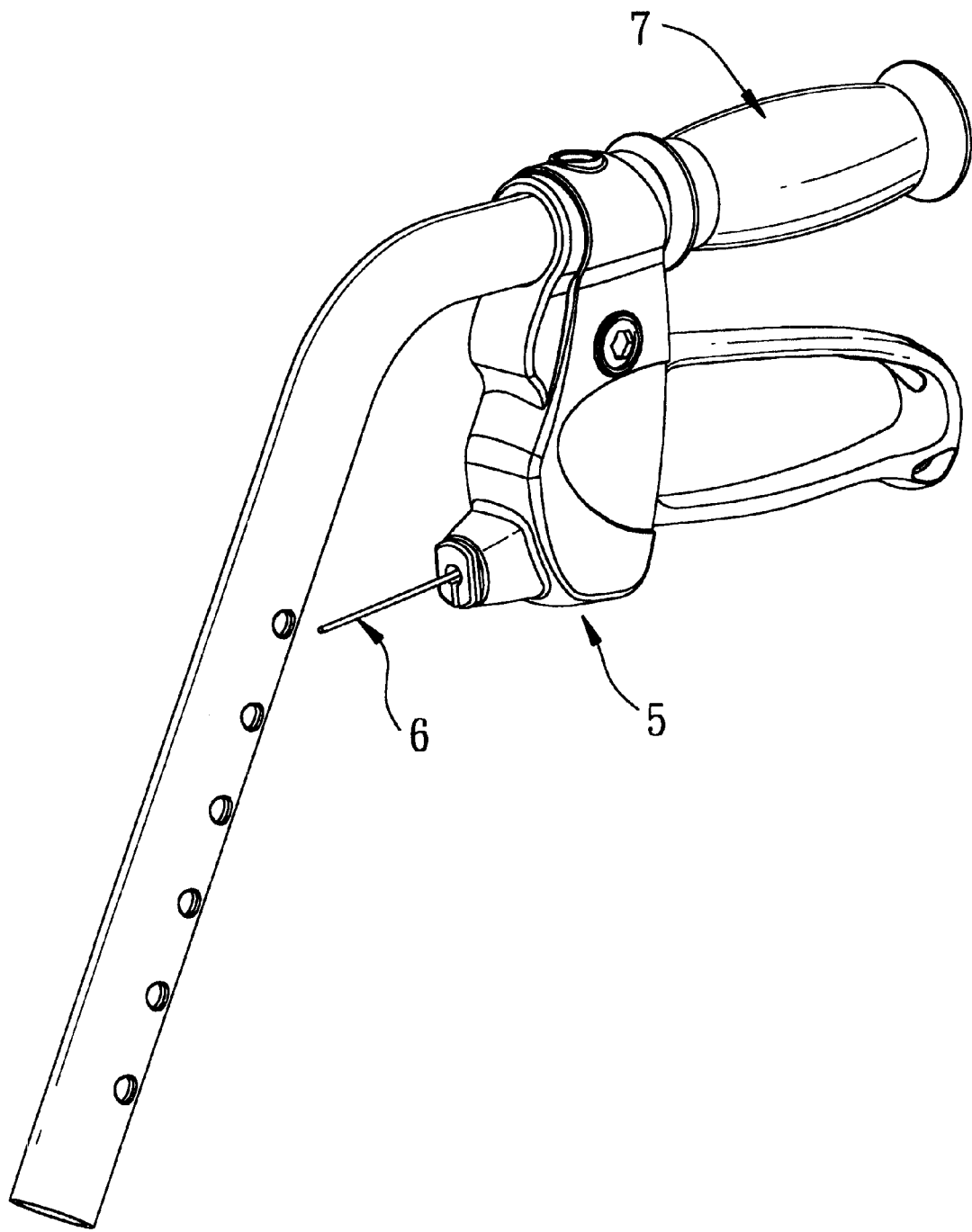
FIG. 5 illustrates a handle of a wheeled cart incorporating the preferred embodiment of a hand brake device of the present invention.
Figure 6:
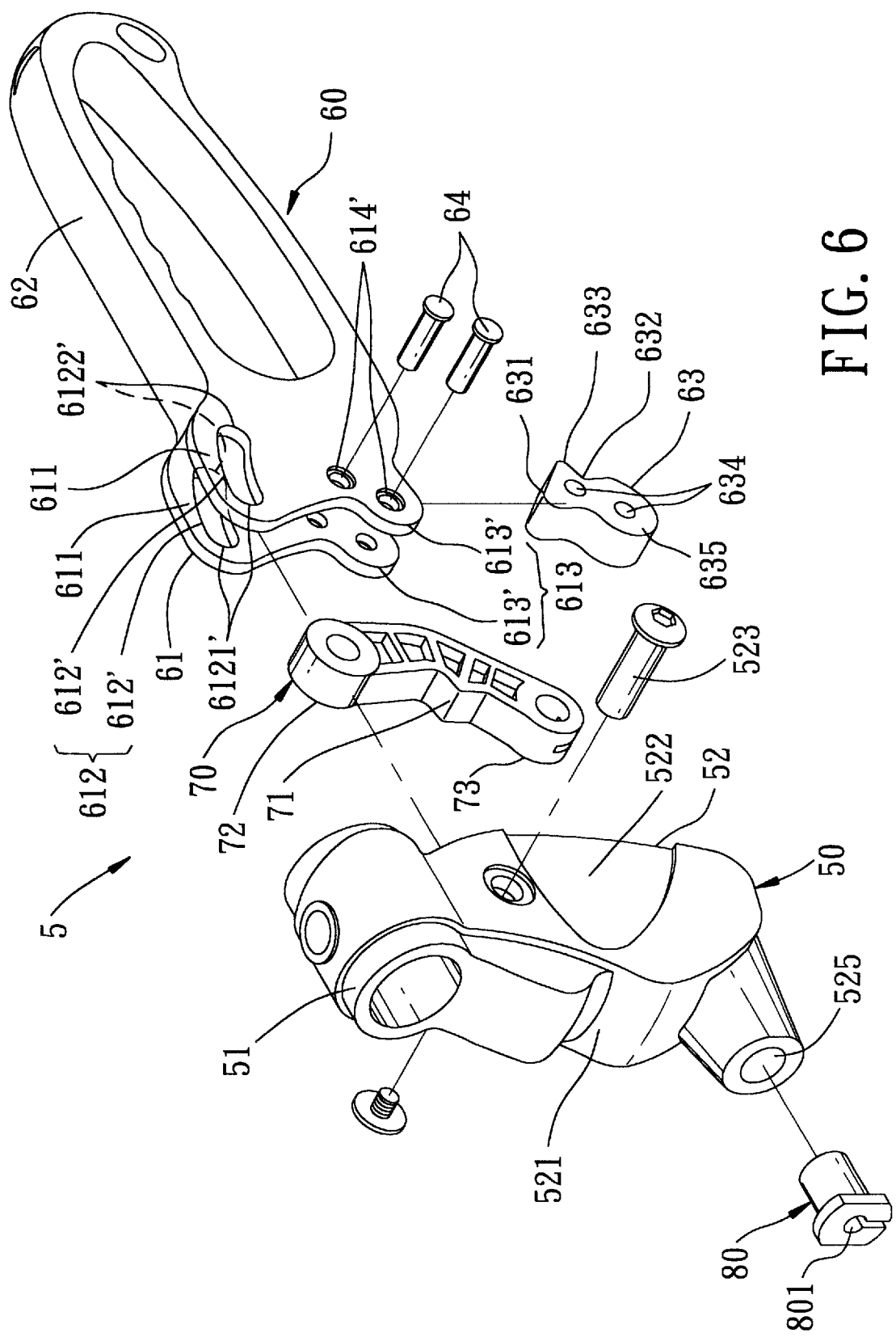
FIG. 6 is an exploded perspective view of the preferred embodiment.
Figure 7:
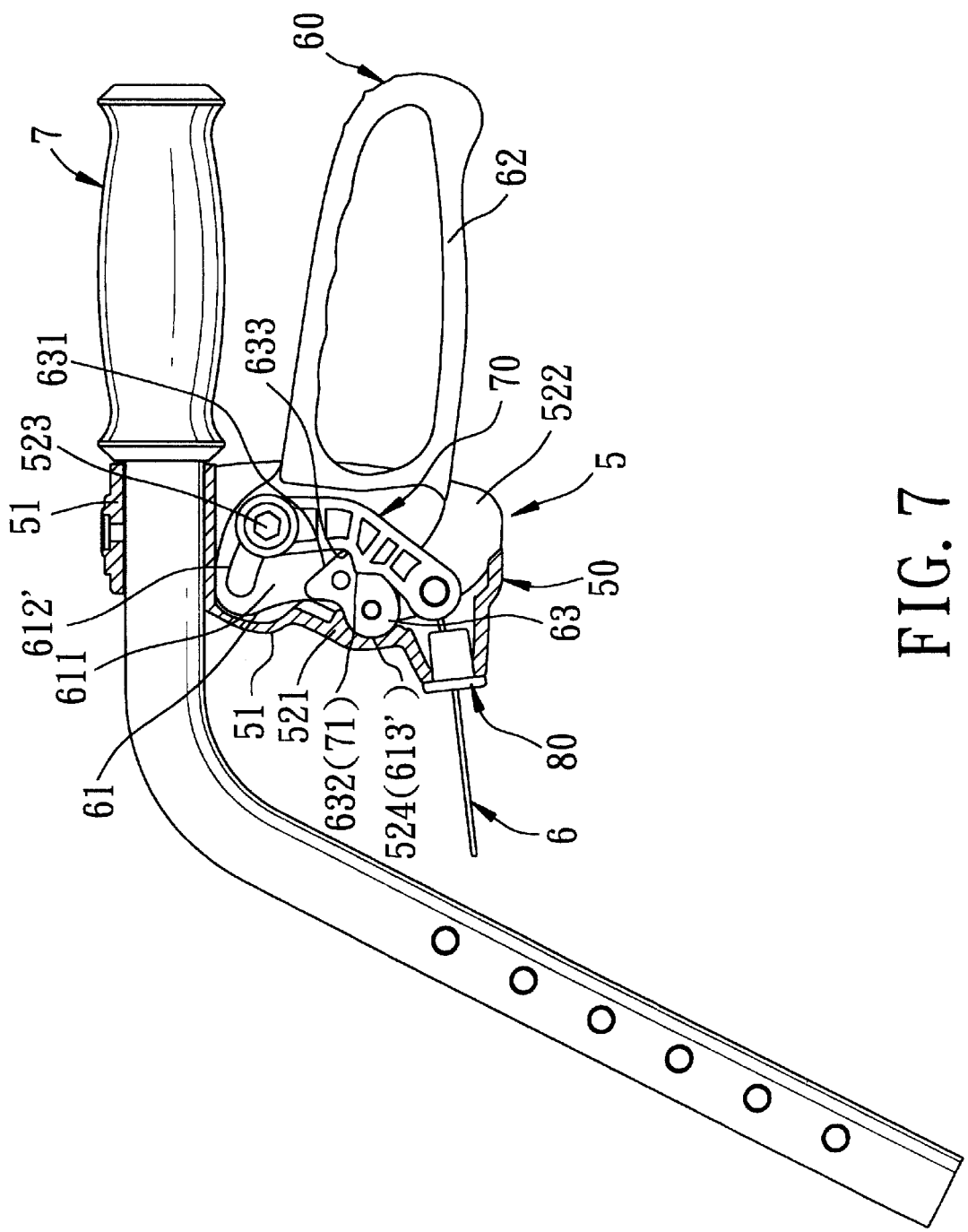
FIG. 7 is a partly sectional view of the preferred embodiment in an assembled state.

Referring to FIGS. 5 to 7, the preferred embodiment of a hand brake device 5 according to the present invention is shown to be adapted to be mounted on a handle 7 of a wheeled cart (not shown) having a brake cable 6, and comprises a housing 50, a brake lever 60, a curved cable pull rod 70, and a cable guiding plug 80.

The housing 50 includes a mounting portion 51 adapted to be sleeved fixedly on the handle 7, and a hollow receiving portion 52 formed integrally with and disposed under the mounting portion 51. The receiving portion 52 includes a front wall 521, two opposite lateral walls 522 extending integrally and rearwardly from the front wall 521, and a pivot pin 523 fixed between the lateral walls 522 of the receiving portion 52. The front wall 521 has an inner wall surface that is formed with a curved limiting groove 524 (see FIG. 7), and a bottom portion that is formed with a through hole 525 therethrough so as to permit extension of the brake cable 6 into the receiving portion 52 through the through hole 525.

The brake lever 60 includes a pivot connecting portion 61, a lever portion 62, a positioning block 63, and two fixing pins 64. The pivot connecting portion 61 is disposed within the receiving portion 52 of the housing 50, has a front lower portion formed with a rounded integral projection 613, and is formed with a curved slot unit 612 that is disposed above and behind the rounded integral projection 613 and that has a closed front end and a closed rear end. In this embodiment, the pivot connecting portion 61 includes two parallel, vertical plates 611, each of which is formed with a curved slide slot 612' that has a closed front end 6121' and a closed rear end 6122', and each of which has a front lower portion formed with an integral lobe projection 613' and a pair of aligned pin holes 614'. The curved slide slots 612' in the vertical plates 611 constitute the curved slot unit 612. The closed front ends 6121' of the slide slots 612' constitute the closed front end of the slot unit 612. The closed rear ends 6122' of the slide slots 612' constitute the closed rear end of the slot unit 612. The integral lobe projections 613' of the vertical plates 611 constitute the rounded integral projection 613 on the front lower portion of the pivot connecting portion 61.

The lever portion 62 of the brake lever 60 extends integrally and rearwardly from the pivot connecting portion 61, and projects from the housing 50. The integral lobe projections 613' of the vertical plates 611 of the pivot connecting portion 61 are received fittingly within the curved limiting groove 524 in the inner wall surface of the front wall 521 of the housing 50 so as to permit rotation of the lever portion 62 about the integral lobe projections 613' in a direction away from the handle 7.

The positioning block 63 of the brake lever 60 is connected fixedly between the integral lobe projections 613' of the vertical plates 611, and has an abutment surface 631 and a retaining groove 632, which are disposed above and behind the integral lobe projections 613' of the vertical plates 611 of the pivot connecting portion 61 and which define a rearwardly extending protrusion 633 there between, and two opposite sidewalls 635 (only one is visible in FIG. 6) that abut against the vertical plates 611, respectively. The positioning block 63 is formed with two spaced-apart holes 634.

The fixing pins 64 are press-fitted respectively within the pin holes 614' in the vertical plates 611, and extend respectively through the holes 634 in the positioning block 63 so as to connect fixedly the positioning block 63 to the integral lobe projections 613' of the vertical plates 611 of the pivot connecting portion 61. The pivot pin 523 extends through the rear ends 6122' of the slide slots 612' in the vertical plates 611 of the pivot connecting portion 61 of the brake lever 60 such that the brake lever 60 can be turned upwardly and downwardly, thereby moving the lever portion 62 toward and away from the handle 7.

The curved cable pull rod 70 (see FIGS. 6 and 7) is disposed within the receiving portion 52 of the housing 50 and between the vertical plates 611 of the brake lever 60, and is located behind and abuts against the positioning block 63. The cable pull rod 70 has a top end 72 sleeved rotatably on the pivot pin 523 of the housing 50, a lower end 73 adapted to be connected fixedly to and pulled forwardly by an end of the brake cable 6, and a retaining portion 71 for engaging the retaining groove 632 in the positioning block 63 of the brake lever 60.

The cable guiding plug 80 (see FIG. 6) is inserted fixedly into the through hole 525 in the bottom portion of the front wall 521 of the housing 50, and has a guide hole 801 for guiding the brake cable 6 into the receiving portion 52 of the housing 50.

Referring once again to FIG. 7, under normal operating condition of the cart, the pivot pin 523 is positioned at the closed rear ends 6122' of the slide slots 612' in the vertical plates 611 of the brake lever 60, the integral lobe projections 613' engage the limiting groove 524 in the inner wall surface of the front wall 521 of the housing 50, and the retaining portion 71 of the cable pull rod 70 engages the retaining groove 632 in the positioning block 63 of the brake lever 60 so that the lever portion 62 of the brake lever 60 is generally parallel to the handle 7 of the cart at this time.

Figure 8:
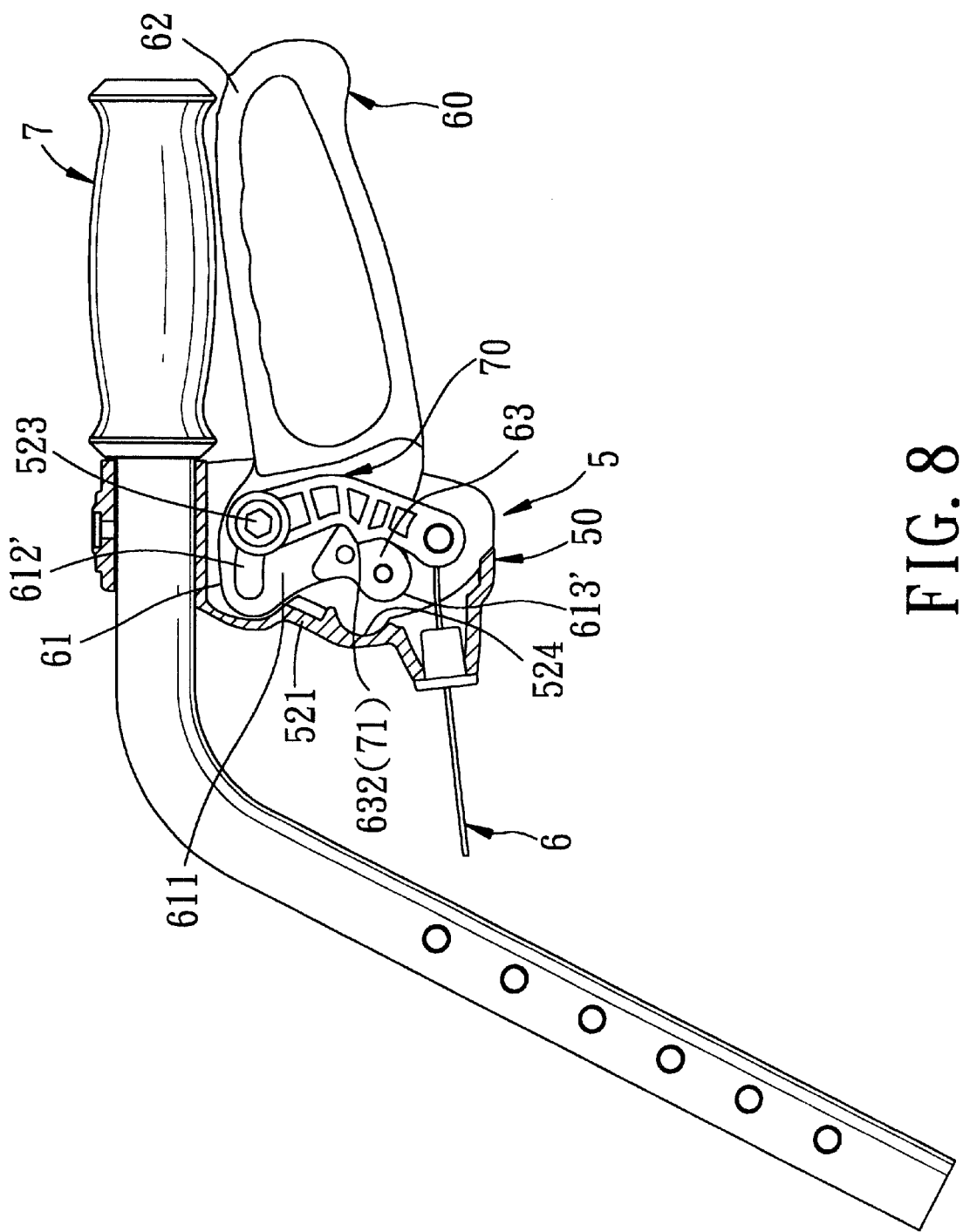
FIG. 8 illustrates the first braking position of the preferred embodiment.

Referring to FIG. 8, when the lever portion 62 of the brake lever 60 is turned upwardly toward the handle 7 of the cart, engagement between the retaining portion 71 of the cable pull rod 70 and the retaining groove 632 in the positioning block 63 and location of the pivot pin 523 within the rear ends 6122' (see FIG. 6) of the slide slots 612' in the vertical plates 611 of the pivot connecting portion 61 of the brake lever 60 are maintained such that the positioning block 63 pushes the cable pull rod 70 to turn rearwardly so as to rotate the brake lever 60 about the pivot pin 523 and so as to separate the integral lobe projections 613' of the brake lever 60 from the limiting groove 524 in the inner wall surface of the front wall 521 of the housing 50, thereby moving the rear end of the brake cable 6 rearwardly for braking the cart. The hand brake device 5 is positioned at a first braking position at this moment. Upon release of the lever portion 62 of the brake lever 60, the restoring force of the brake cable 6 pulls and moves the lower end 73 of the cable pull rod 70 forwardly so as to engage the integral lobe projections 613' of the brake lever 60 within the limiting groove 524 in the inner wall surface of the front wall 521 of the housing 50, thereby restoring the lever portion 62 of the brake lever 60 to its original position shown in FIG. 7, and thereby restoring the cart to its normal operating condition.

Figure 9:
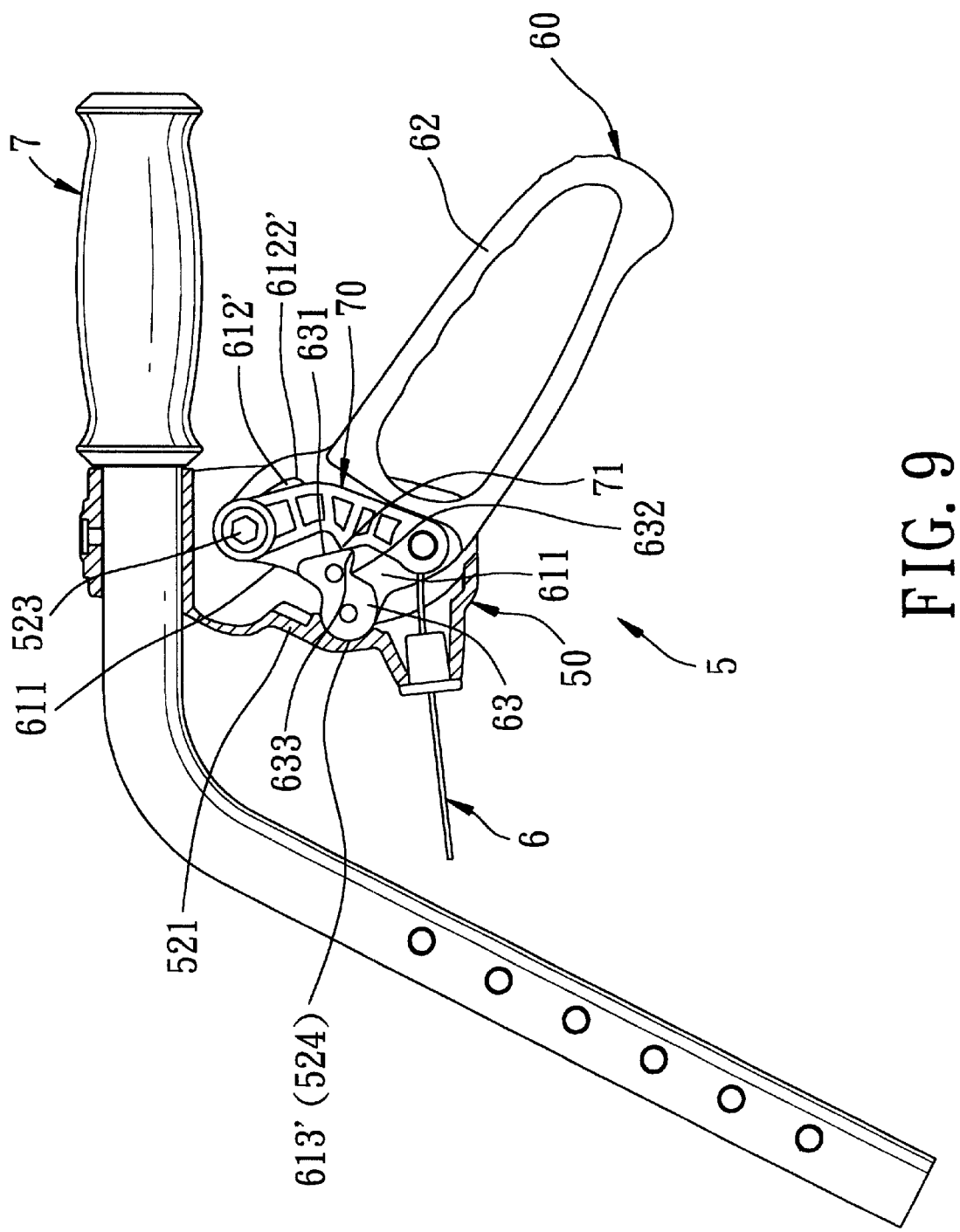
FIG. 9 illustrates the second braking position of the preferred embodiment.

Referring to FIG. 9, when the lever portion 62 of the brake lever 60 is turned downwardly away from the handle 7 of the cart, the integral lobe projections 613' of the vertical plates 611 of the brake lever 60 maintain their engagement with the limiting groove 524 in the inner wall surface of the front wall 521 of the housing 50, and the lever portion 62 rotates about the integral lobe projections 613' such that the pivot pin 523 slides from the rear ends 6122' to the front ends 6121' (see FIG. 6) of the slide slots 612' in the vertical plates 611 of the brake lever 60 so that the retaining portion 71 of the cable pull rod 70 separates from the retaining groove 632 in the positioning block 63 to move past the rearwardly extending protrusion 633 of the positioning block 63 so as to engage the abutment surface 631 of the positioning block 63, thereby pulling and moving the rear end of the brake cable 6 rearwardly for braking the cart and thereby preventing further rotation of the brake lever 60 about the integral lobe projections 613'. The hand brake device 5 is positioned at a second braking position at this time. The lever portion 62 of the brake lever 60 can be turned upwardly toward the handle 7 only when an external force is applied to the lever portion 62, thereby restoring the lever portion 62 to its original position shown in FIG. 7, and thereby restoring the cart to its normal operating condition.

From the above description of the preferred embodiment of the hand brake device 5 of the present invention, some of the advantages of the hand brake device 5 can be summarized as follows:

1. Since the brake lever 60 and the cable pull rod 70 are pivotally connected to the housing 10 by only one pivot pin 523, elements of the hand brake device 5 are reduced.

2. When the brake lever 60 is turned from the position shown in FIG. 7 to that shown in FIG. 8, the rotational angle of the cable pull rod 70 is equal to that of the brake lever 60 such that the lower end 73 of the cable pull rod 70 and the brake cable 3 can be moved to a relatively large extent, thereby effectively executing a strong braking action on the cart.

3. Since the first braking position of the hand brake device 5 is frequently applied to the cart, and since the retaining portion 71 of the cable pull rod 70 engages fittingly the retaining groove 632 in the positioning block 63 of the brake lever 60 during rotation of the brake lever 60 from the position shown in FIG. 7 to that shown in FIG. 8, the retaining portion 71 and the retaining groove 632 in the positioning block 63 are less likely to quickly wear off.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A hand brake device adapted to be mounted on a handle of a wheeled cart having a brake cable, said hand brake device comprising:

a housing including a mounting portion adapted to be sleeved fixedly on the handle, and a hollow receiving portion connected fixedly to and disposed under said mounting portion, said receiving portion including a front wall having an inner wall surface that is formed with a curved limiting groove, and a bottom portion that is formed with a through hole therethrough, which is adapted to permit extension of the brake cable into said receiving portion through said through hole, two opposite lateral walls extending integrally and rearwardly from said front wall, and a pivot pin fixed in said receiving portion;

a brake lever including a pivot connecting portion that is disposed within said receiving portion of said housing and that has a front lower portion formed with a rounded integral projection, a lever portion that extends integrally and rearwardly from said pivot connecting portion and that projects from said housing, and a positioning block that is connected fixedly to said front lower portion of said pivot connecting portion, said rounded integral projection being received fittingly within said curved limiting groove in said front wall of said housing so as to permit rotation of said lever portion of said brake lever about said rounded integral projection of said pivot connecting portion in a direction away from the handle, said positioning block having an abutment surface and a retaining groove, which are disposed above and behind said rounded integral projection of said pivot connecting portion and which define a rearwardly extending protrusion therebetween, said pivot connecting portion being formed with a curved slot unit that is disposed above and behind said rounded integral projection and that has a closed front end and a closed rear end, said pivot pin of said housing extending through said rear end of said curved slot unit such that said brake lever can be turned upwardly and downwardly, thereby permitting movement of said lever portion toward and away from the handle; and a cable pull rod disposed within said receiving portion of said housing and located behind and abutting against said positioning block, said cable pull rod having
  a top end sleeved rotatably on said pivot pin of said housing,
  a lower end adapted to be connected fixedly to and pulled forwardly by an end of the brake cable, and
  a retaining portion for engaging said retaining groove in said positioning block;

wherein when said lever portion of said brake lever is turned upwardly, engagement between said retaining portion of said cable pull rod and said retaining groove and location of said pivot pin within said rear end of said curved slot unit are maintained such that said positioning block pushes said cable pull rod to turn rearwardly so as to rotate said brake lever about said pivot pin, thereby moving the rear end of the brake cable rearwardly for braking the cart, after which, upon release of said lever portion of said brake lever, the brake cable pulls and moves said lower end of said cable pull rod forwardly to engage said rounded integral projection of said brake lever within said curved limiting groove in said front wall of said housing; and wherein when said lever portion of said brake lever is turned downwardly, said lever portion of said brake lever rotates about said rounded integral projection of said pivot connecting portion such that said pivot pin slides from said rear end of said curved slot unit to said front end of said curved slot unit so that said retaining portion of said cable pull rod separates from said retaining groove in said positioning block to move past said rearwardly extending protrusion of said positioning block so as to engage said abutment surface of said positioning block, thereby pulling and moving the rear end of the brake cable rearwardly for braking the cart and thereby preventing further rotation of said brake lever about said rounded integral projection, after which said brake lever can be turned upwardly toward the handle only when an external force is applied to said lever portion of said brake lever.

2. The hand brake device of claim 1, wherein said pivot connecting portion of said brake lever includes two parallel, vertical plates, each of which is formed with a curved slide slot that has a closed front end and a closed rear end, said slide slots in said vertical plates constituting said curved slot unit, said closed front ends of said slide slots constituting said closed front end of said slot unit, said closed rear ends of said slide slots constituting said closed rear end of said slot unit.

3. The hand brake device of claim 2, wherein said vertical plates are further formed with two pairs of aligned pin holes, said positioning block being formed with two spaced-apart holes, said brake lever further including two fixing pins that are press-fitted within said pin holes and that extend respectively through said holes in said positioning block, said positioning block having two opposite side walls that abut against said vertical plates, respectively, whereby, said positioning block is connected fixedly to said pivot connecting portion of said brake lever.

* * * * *